United States Patent [19]

Kim

[11] Patent Number: 4,651,953
[45] Date of Patent: Mar. 24, 1987

[54] INDUCTION LIFT AIRCRAFT

[76] Inventor: Kyusik Kim, 5026 Rhoads Ave., Santa Barbara, Calif. 93111

[21] Appl. No.: 849,116

[22] Filed: Apr. 7, 1986

Related U.S. Application Data

[63] Continuation of Ser. No. 701,856, Feb. 14, 1985, which is a continuation of Ser. No. 240,619, Mar. 5, 1981, Pat. No. 4,500,052.

[51] Int. Cl.$^4$ .............................................. B64C 21/00
[52] U.S. Cl. ...................................... 244/12.1; 244/15; 244/36
[58] Field of Search .................... 244/12.1, 15, 12.5, 244/12.6, 36, 207, 62, 53 R, 73 R, 74

[56] References Cited

U.S. PATENT DOCUMENTS

| | | |
|---|---|---|
| 2,465,457 | 3/1949 | Johnson . |
| 2,670,597 | 3/1954 | Billenejane . |
| 2,751,168 | 6/1956 | Stalker . |
| 3,126,171 | 3/1964 | Sepniewski et al. . |
| 3,139,247 | 1/1964 | Schneider . |
| 3,829,043 | 8/1974 | Benson . |
| 3,931,942 | 1/1976 | Alperts . |

Primary Examiner—Galen Barefoot
Attorney, Agent, or Firm—Daniel J. Meaney, Jr.

[57] ABSTRACT

A vacuum cell induction lift wing adapted to be used in an aerodynamic generating channel wherein the lift wing includes an airfoil having a leading edge and a trailing edge and a top panel and an acoustically treated hollow interior, and wherein the airfoil includes airtight partitions forming individual cells within the hollow interior and the airfoil has inclined slots extending from the top panel into each of the individual cells wherein the inclined slots extend at an angle from each of the individual cells toward the trailing edge of the airfoil and wherein the airfoil is adapted to be positioned within an aerodynamic generating with the top panel of the airfoil being adapted to form a lower boundary of the aerodynamic generating channel and to define a slip thereacross from an airstream support operatively coupled to the airfoil adjacent the trailing edge to enable the airfoil to be rotated therearound to change the angle of incidence of the top panel to an airstream passing thereacross and a pivot support operatively couples to the airfoil adjacent the leading edge for moving the airfoil leading edge relative to an airstream by rotating the airfoil around the support member to change the angle on incidence of a top panel relative to an airstream enabling the airflow thereof to generate a vacuum within the individual cells is shown.

A jet thrust peripheral flow recycling system and induction lift aerodynamic generating channel using the vacuum cell induction lift wing is also shown.

3 Claims, 22 Drawing Figures

INDUCTION LIFT AIRCRAFT

This is a continuation of application Ser. No. 06/701,856 filed Feb. 14, 1985, which was a continuation of application Ser. No. 06/240,619 filed Mar. 5, 1981 now U.S. Pat. No. 4,500,052.

BACKGROUND OF THE INVENTION

1. Field of the Invention

This invention relates to the propulsion system of an aircraft. It utilizes a liquid fuel prevaporization and back burning induction jet oval thrust nozzle which is fitted onto the exit nozzle of a conventional turbojet engine having a ram constriction air inlet plenum-engine pod located forward of the aerodynamic generating channel. The aerodynamic generating channel is located forward and above a vacuum cell induction lift wing and below recycling air inductor vanes.

2. Description of the Prior Art

Tail pipes having round exit nozzles adapted to be affixed the exit nozzle of conventional turbojet engines are known in the art.

SUMMARY OF THE PRESENT INVENTION

This invention relates to a round engine exit nozzle transition to a vertically converging and horizontally diverging oval thrust nozzle wherein the thrust nozzle has main airflow inducing nozzles, fuel injecting airflow inducing nozzles, combustion chambers, inductor vanes, liquid fuel prevaporization chambers, vaporized gas distributing manifolds with discharge nozzles, fuel injectors, ignitors and empty spaces adjacent the engine pod which forms a plenum. Air intake bellmouths of airflow inducing nozzles are installed inside the ram constriction air inlet plenums which are empty spaces in the engine pod on both sides of engine throat downstream of airflow inducing nozzles. The outlet of the airflow inducing nozzles are diverging and enter into the combustion chambers. The downstream ends of the combustion chambers are parallel vertical equally spaced and downstreamwardly curved inductor vanes. Hollow spaces between the plenum wall and the flat span of transition walls comprise vaporization chambers fitted with fuel injecting sprays and vaporized gas distributing manifolds with discharge nozzles. The discharge nozzles are downstreamwardly inclined and connected on the minor axes span areas of the oval thrust nozzle. The openings of the inclined discharge nozzles are adequate for the slipflow of the thrust stream and the discharge nozzles are positioned slightly upstream from throat of the oval thrust nozzle for accommodation of ignition time span and to process the temperature reactants of back firing combustion downstream of the oval thrust nozzle. The dynamic pressure of the turbojet engine exhaust stream slipflows over the inductor vanes and induces induction air flow from the plenums through the airflow inducing nozzles. This results in increased airstream volume at the oval thrust nozzle. The turbo-induction jet air breathing is operative when the aircraft is on the ground with engine idling, during low speed operation of the aircraft or deceleration of the aircraft during flight.

When the the induction jet air breathing stream is injected with prevaporized liquid fuel to produce a combustable mixture which when ignited produces a flame thrist stream downstream of the oval thrust nozzle. The expansion of the flame stream through the diverging contour of aerodynamic generating channel causes the flame thrust stream dynamic pressure to induce streams of air from surrounding air through the slot gap between the flat span of oval thrust nozzle and the leading edge of wing. This results in a recycled airstream at the forward upper portion of the aerodynamic generating channel which passes-through the reverse flow duct which is caused by the peripheral flow of rarefied thrust. These airstreams are merged with flame thrust which then produce the expanding combustion thrust stream in the diverging contour of the aerodynamic generating channel over the vacuum cell induction lift wing. The dynamic pressure of the expanding combustion thrust stream slipflows over the downstreamwardly inclined slot openings of vacuum cell wing. This stream action on the wing induces vacuum in internal cells of the wing which creates aerodynamic lift and drag forces on the wing. These forces correspond with the incidence angle of the wing which is the angle between the center-line of thrust stream and the wing chord line. The forces generated on the wing results in the drag force which counteracts the forward thrust of engine and stabilizies the horizontal moment of the airframe. The lift forces balance the weight of the aircraft during hovering of the aircraft. Hovering capacity for the aircraft is accomplished by the turbo-inducting jet air breathing rocket thrust aerodynamic generating channel.

Forward speed of the aircraft generates additional lift forces on the airfoil shaped airframe. These additional lift forces correspond to the reduction of the incident angle of the wing which reducts the drag forces on the vacuum cell wing. Forward acceleration is accomplished by the aircraft, from the aircraft hovering to the aircraft operating at hypersonic flight, by use of the liquid fuel prevaporization and backburning induction jet oval thrust nozzle.

The ram constriction air inlet plenums produce ramstatic pressures when the aircraft is in high speed flight.

The ram airstream from the plenum pass through the airflow inducing nozzles and flow into the oval thrust nozzle. When fuel injectors are turned on downstream of the throat of the fuel injecting airflow inducing nozzles, a combustable mixture is produced. The combustion mixture is ignited and produces a flame stream which flows downstream of the main airflow inducing nozzles and enter the combustion chamber. The expanded combustion streams product ramjets through the diverging contours of the combustion chambers. The expanding ramjet airstream are combined with the turbojet stream at oval thrust nozzle. The oval thrust nozzle handles the turbojet stream and the ramjet streams creating a turbo-ram induction jet air breathing engine. The turbo-ram induction jet air breathing engine operates on the principle of free stream air intake, which are tangential oblique stream flows, interacting with a throat constriction to achieve a critical pressure. The free stream throat, located inside the low velocity air plenums, results in first a constraining of the ram airflow and then the expanding of the ram-airstream which controls the ram pressure on air intake bellmouths of the ram-airflow inducing nozzles which are ramjet components of the induction jet oval thrust nozzle. The turbo-ram induction jet air breathing oval thrust stream is operated when the aircraft is in supersonic flight.

When the turbo-ram induction jet air breathing oval thrust stream receives an injection of prevaporized liquid fuel prevaporization a combustable mixture is produced. The combustable mixture is ignited and produces a flame thrust stream downstream of the oval thrust nozzle in the forward section of aerodynamic generating channel. The dynamic pressure of back burning oval thrust stream induces a recycled peripheral thrust airstream which diverts the stream into the forward and upper portion of channel through the reverse flow duct and recycling inductor vanes. The leading edge of wing on an aircraft operating at high speed induces an oblique shock airstream which interacts with the flame stream of a turbo-ram induction jet air breathing rocket thrust. The streams are tangentially constricted to develop a critical pressure and form a high velocity free stream throat in the forward section of channel. These streams are merged with the expanding ignited combustion mixture downstream of the free stream throat and the expansion of thrust stream in the diverging contours of channel results in a hypersonic velocity which is accomplished by the turbo-ram induction jet air breathing rocket thrust aerodynamic generating channel.

The liquid fuel prevaporization and back burning induction jet oval thrust nozzle which is fitted on the round exit pipe of conventional ram-axialflow turbine having a ram constriction air inlet plenum which is installed in the ram-stream zone of airframe. The ram-axialflow turbine is operated during high speed flight and the fuel injectors in the ram-airflow inducing nozzles are activated to ignite the combustible mixture to produce, downstream of the airflow inducing nozzles, the ramjet streams in the combustion chambers. The expanding ramjet streams slipflow over the exit pipe of axialflow turbine and induce a negative pressure region downstream of the turbine which, result in an increased pressure differential on the turbine inlet and outlet. This enchances the power of the ram-axialflow turbine and operates an electric generator. The ramjet-induction axialflow turbine operation is obtsined by the liquid fuel prevaporization and back burning induction jet oval thrust nozzle fitted onto the conventional axialflow turbine. When the ramjet induction axialflow turbine thrust stream is mixed with the prevaporized liquid fuel at the throat of ramjet induction oval thrust nozzle and the combustible mixture is ignited, hypersonic flame thrust is produced which provides the capacity of hypersonic flight and the ability to generate a high capacity electrical power source for future developments.

The liquid fuel prevaporization and back burning induction jet oval thrust nozzle is technically feasibile for use with conventional air breathing engine to convert the same to a multi-stage power plant using an induction jet air breathing engine. The multi-stage power plant can be used in an induction lift aircraft. The multi-stage power plant using the air breathing jet engine is based on the principal of management of fuel injection, as described above, and on the principals of induction and free stream constriction where the induction is based on the freedom balancing beyond-dynamic pressure of thermal thrust stream interacting on the diverging contours of the transition tail pipe and aerodynamic generating channel. A free stream formed of tangentially flowing oblique stream intersects with and is shaped by a throat constriction to develop a critical pressure in a constricted free stream flow and the constricted free air stream flow is then expanded on the air intake zone of the low velocity air plenums and in the aerodynamic generating channel. The power plant stages are summarized below:

Stage 1: Turbo-induction jet air breathing engine;
Stage 2: Turbo-induction jet air breathing rocket engine;
Stage 3: Turbo-ram induction jet air breathing engine; and
Stage 4: Turbo-ram induction jet air breathing rocket engine.

DESCRIPTION OF THE DRAWINGS

This invention is described in accompanying drawings which are.

DESCRIPTION OF THE PREFERRED EMBODIMENT

As illustrated in FIGS. 1 through 4, the outside of the power plant has a shape which defines a low velocity air plenum-engine pod. Multiple vanes are fitted on the inclined air intake opening at the forward section of the plenum. The induction jet oval thrust transition tail pipe is fitted on the rear end of the plenum. The conventional turbojet engine is installed inside of and on the center-line of the plenum.

Figure 1:
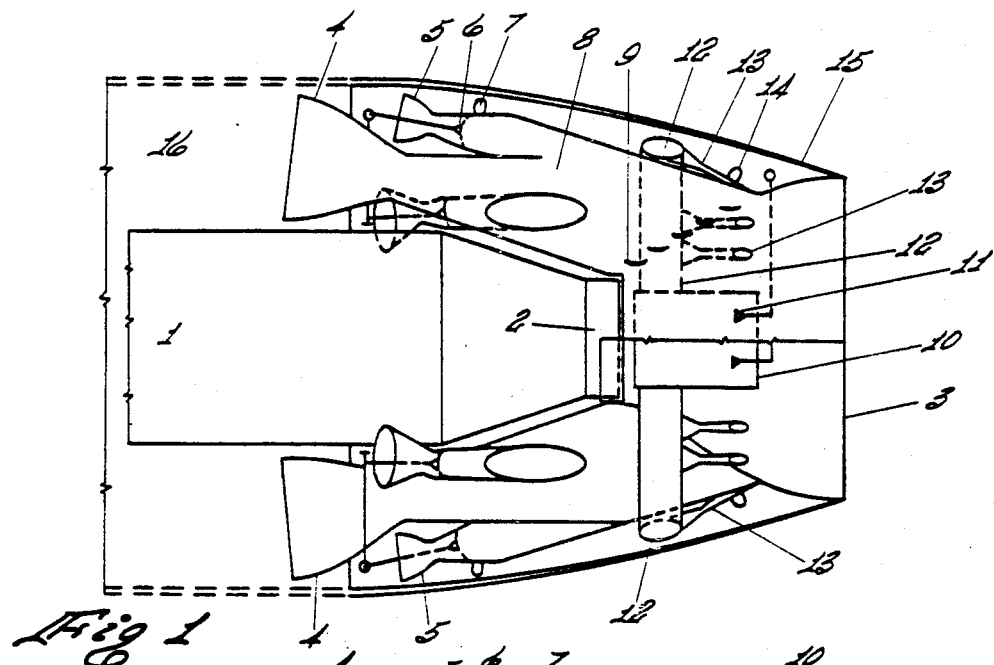
FIG. 1 is a plan view of a liquid fuel prevaporization induction jet oval thrust nozzle which is adapted to be attached to a conventional turbojet engine.
Figure 2:
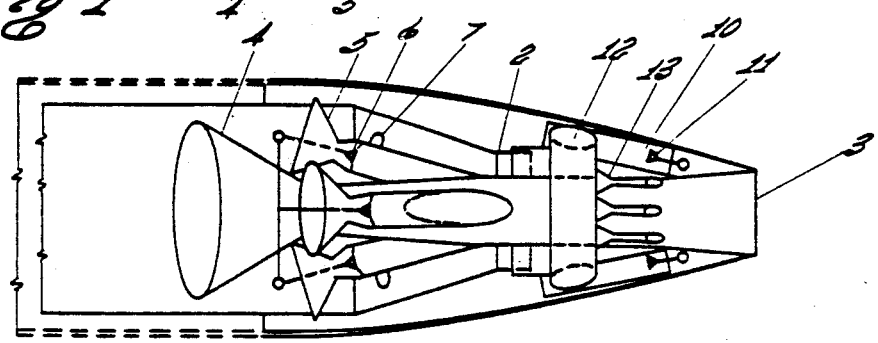
FIG. 2 is a side view of FIG. 1 showing the riund engine exit nozzle.
Figure 3:
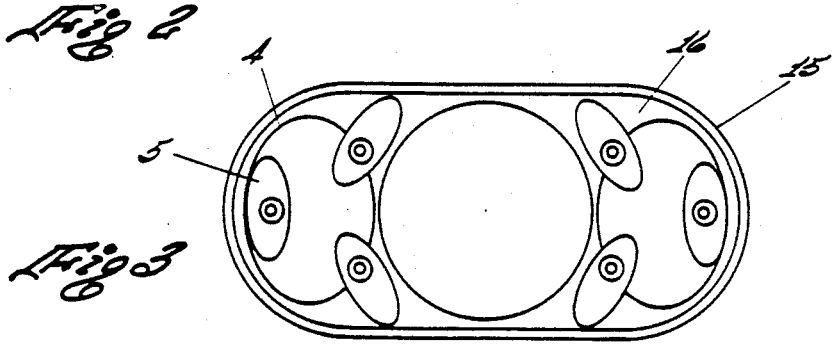
FIG. 3 is a cross section of FIGS. 1 and 2 showing the throat of the airflow inducing nozzles.
Figure 4:
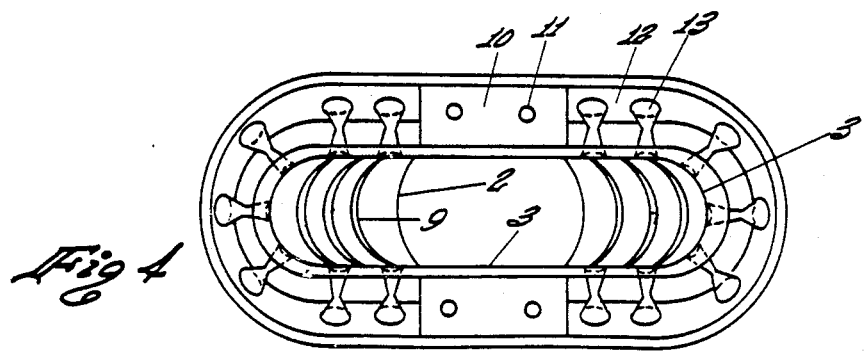
FIG. 4 is a cross section at the throat of the oval thrust nozzle.
Figure 5:
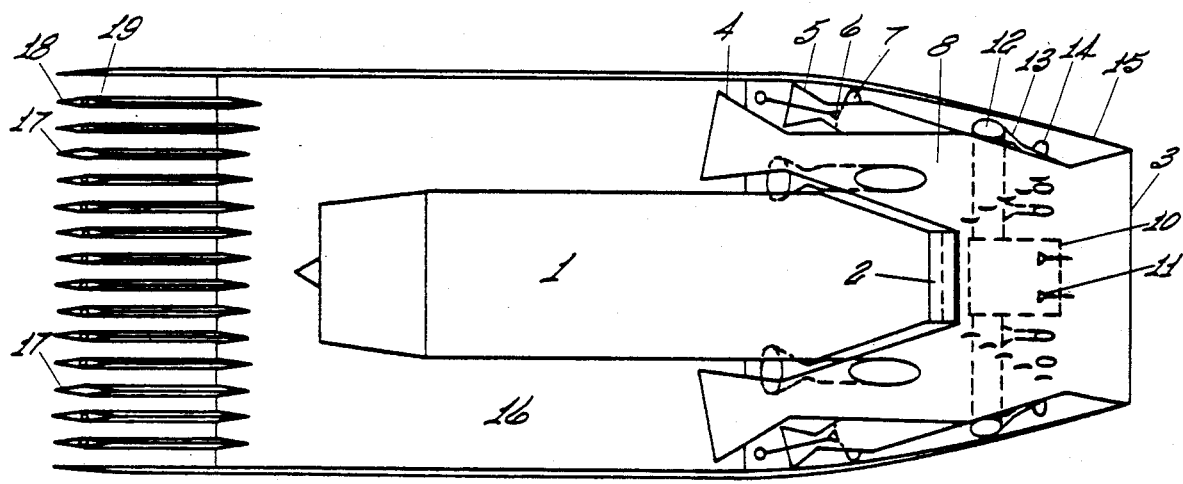
FIG. 5 is a plan view of the induction jet air breathing power plant having a conventional turbojet engine and the liquid fuel prevaporization and back burning induction jet oval thrust nozzle which includes a plenum containing an inclined air intake opening fitted with rigidly fixed straight vanes and deflectable tailing sectin of vanes.
Figure 6:
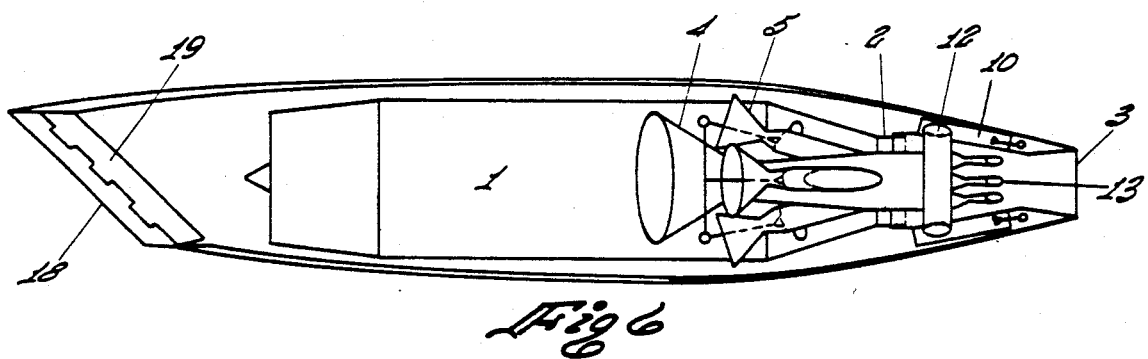
FIG. 6 is a side view of FIG. 5 showing inclined air intake of the plenum showing the fixed and deflectable vanes.
Figure 7:
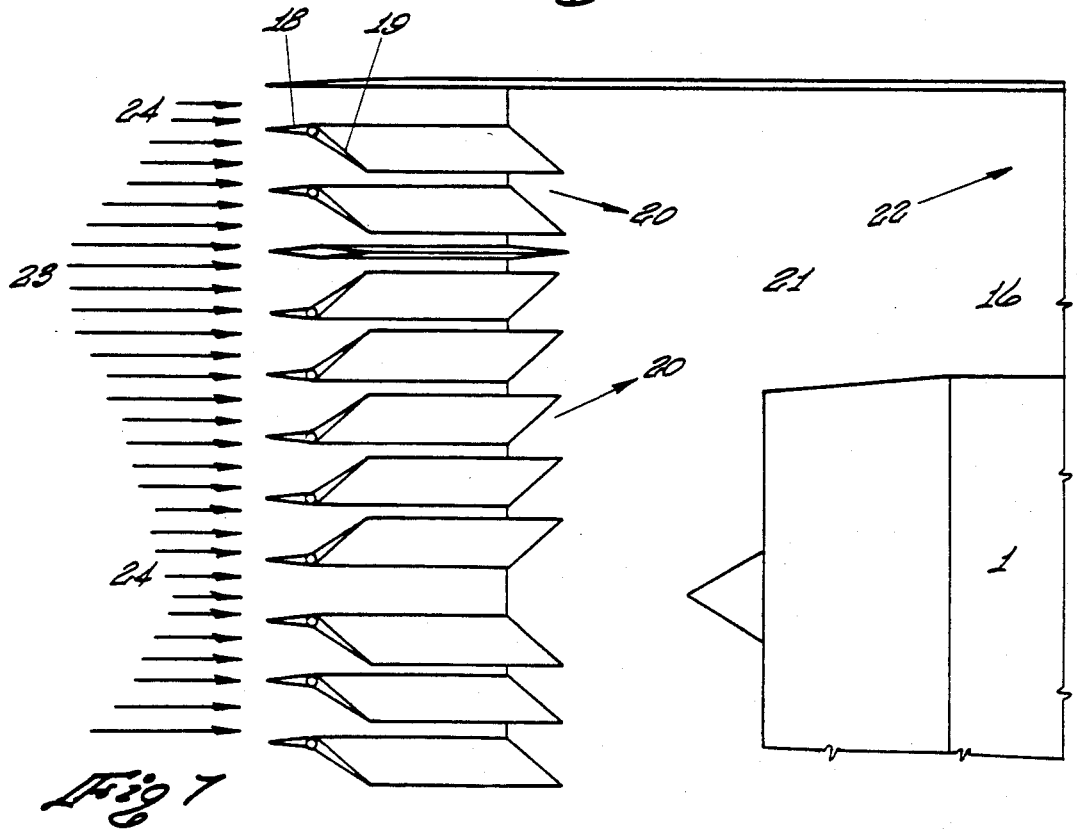
FIG. 7 is a partial paln view of the ram constriction air inlet plenum.
Figure 8:
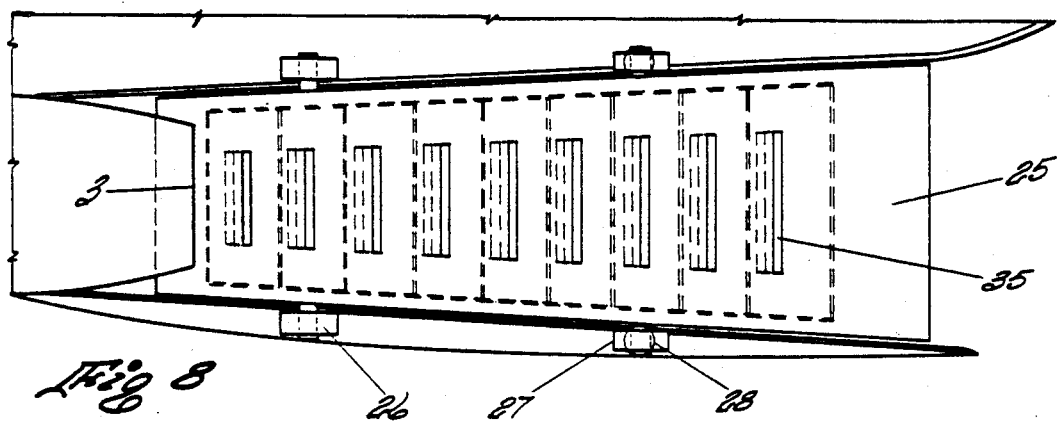
FIG. 8 is a plan view of the aerodynamic generating channel.
Figure 9:
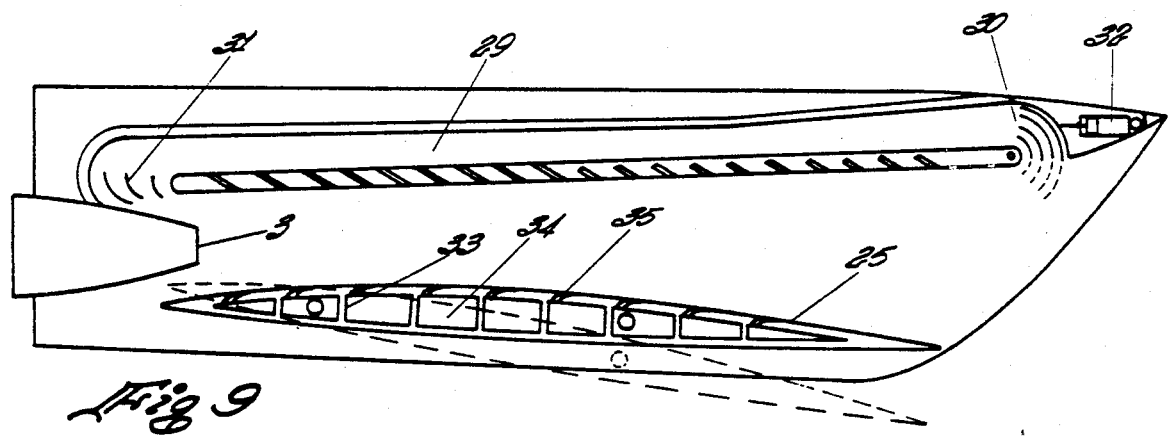
FIG. 9 is a longitudinal section of the aerodynamic generating channel having an a vacuum cell induction lift wing with an acoustically treated hollow interior wherein the airfoil has airtight partitions containing downstream inclined slot openings.
Figure 10:
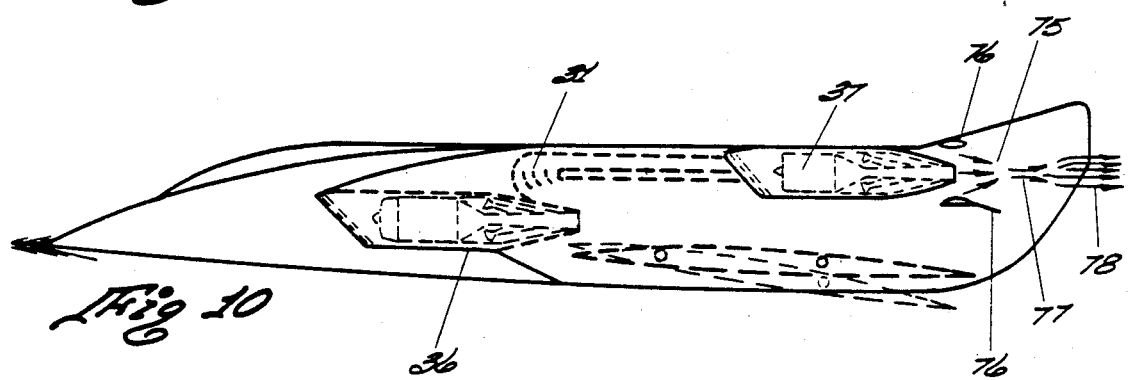
FIG. 10 is a side elevation of the induction lift aircraft.
Figure 11:
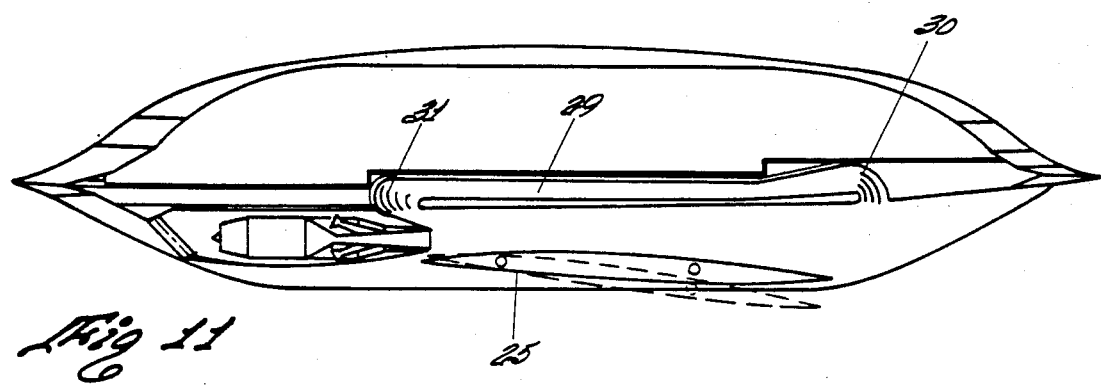
FIG. 11 is a longitudinal sectional view of an induction lift flying saucer.

The air inlet of the ram constriction system is illustrated in FIGS. 5, 6 and 7. Multiple inflective vertical vanes assemblies are fitted on the inclined opening at the forward portion of the low-velocity air plenum-engine pod. The vanes are fabricated with rigidly fixed straight vanes 17 and are positioned in the center-zones of the low velocity air plenums 16 located in the empty spaces on both sides of engine 1.

Figure 12:
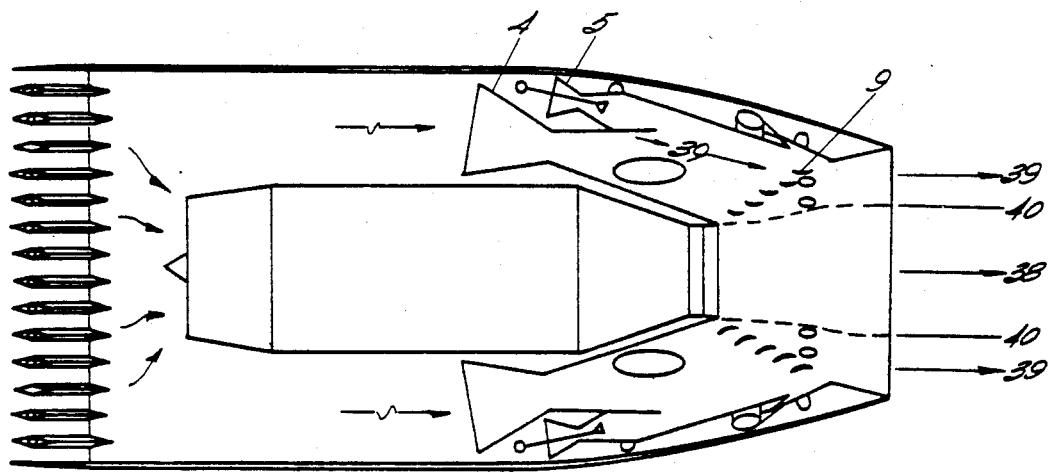
FIG. 12 is a schematic view of a turbo induction jet aircraft when the aircraft is operated in a neutral position, low speed flight or deceleration of flight.
Figure 14:
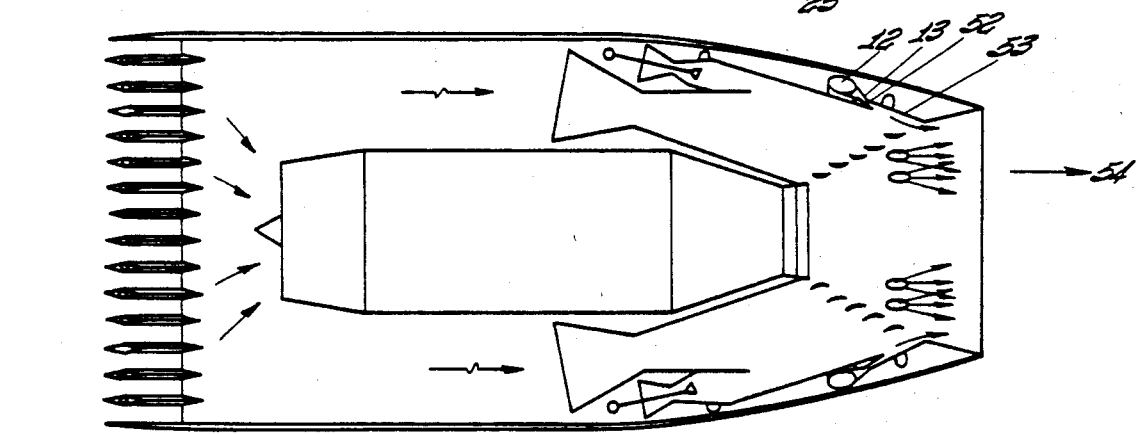
FIG. 14 is a schematic diagram of a turbo induction jet air breathing engine when the aircraft is operated in VTOL.

Deflectable trailing section of vanes 19 are hinged with rigidly fixed forward section of vanes 18 and are equally spaced from the rigidly fixed straight vanes 17. The deflectable trailing section of vanes 19 are linked with conventional hydraulic actuators for adjusting the position of vanes such as in the closed or open position. Deflectable vanes 19 are positioned straightly and parallel with the rigidly fixed straight vanes 17 when the air intake is wide open as illustrated in FIGS. 12 and 14. The postion of the vanes illustrated in FIGS. 12 and 14 applies when the aircraft is in stationary or low speed and deceleration of flight.

Figure 16:
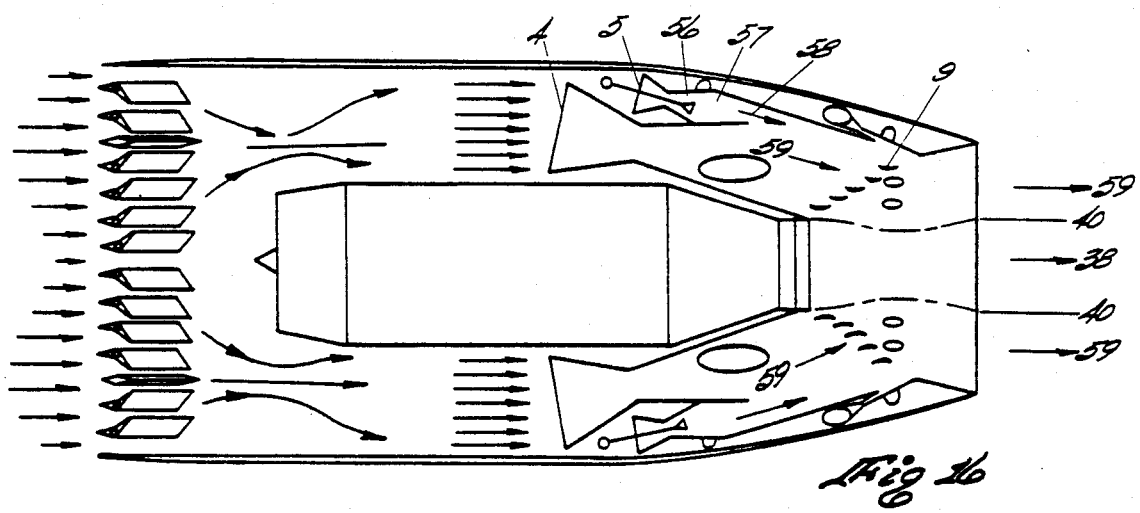
FIG. 16 is a schematic diagram of of turbo-induction jet air breathing thrust stream when the aircraft is operated in supersonic flight.
Figure 17:
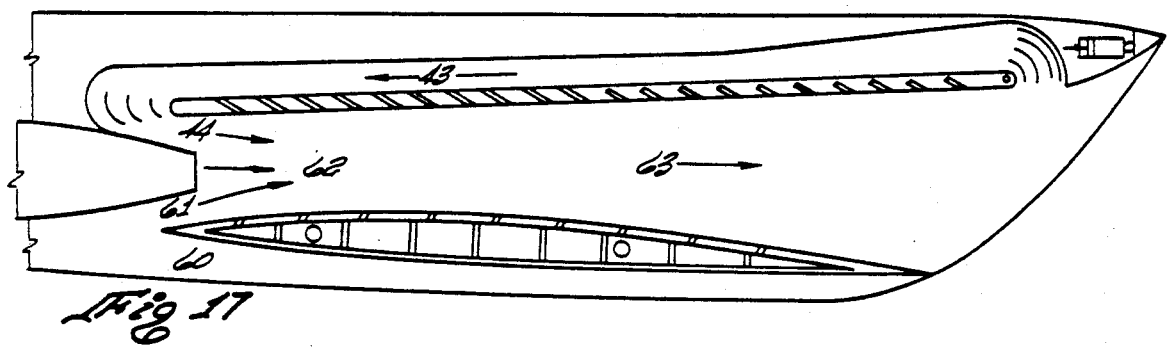
FIG. 17 is a schematic diagram showing the distribution of turbo-ram induction jet air breathing thrust stream in the aerodynamic generating channel when the aircraft is operated in supersonic flight.
Figure 18:
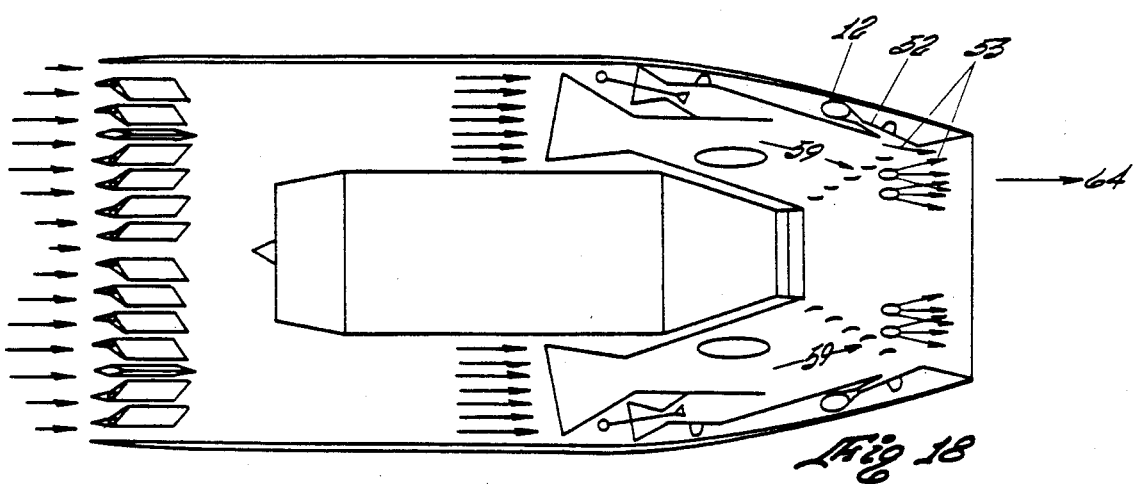
FIG. 18 is a schematic diagram of of turbo-ram induction jet rocket air breathing thrust stream when the aircraft is operated in hypersonic flight.

FIGS. 16 and 18 illustrate the positon of the vanes when actuated by the hydrauic actuators to deflect the trailing sections thereof toward the straight vanes 17. This position applies when the aircraft is in high speed flight. The sahping action of the ram-stream inside the low velocity air plenums are illustrated in FIG. 7. This occurs when the deflected trailing sections of vanes 19 are bent toward the rigidly fixed straight vanes 17 positioned on the center-line of the low velocity air plenums, which occurs during supersonic flight.

The ram-stream impacts on the rigidly fixed forward section of the vanes 18. The ram-stream is restricted and deflected by the trailing section of vanes 19. The stream flow directions are inflected by the vanes 19 to produce the oblique streams 20. These streams are tangentially constrained towards the center-line zone of the low velocity air plenums 16. The shaping action of the ram-constriction causes the ram-stream to reach the critical pressure to form the free stream throat 21 and controls the stream pressure which is achieved by the ram-stream and controls the ram-air volume and ram-pressure inside the low velocity plenums 16. This results in a reduction of the dynamic drag force on the engine suction diffuser during high speed flight. The ram drag is reduced on the front of the air intake opening. This is caused by the variable ram back pressure gradient downstream of the vanes where the center zones of ram constriction portion has more pressure drag force 23 on the front of the vanes and less pressure drag force 24 on the front of the engine suction and on both sides the air separation zones downstream of the vanes. The ram drag force on the front of the vanes, which is ram pressure, exceeds the critical pressure downstream of the vanes. This results in the pressure drag dynamic slipdown on the inclined face of the air intake which is a reduction of the ram drag force on the front of the air intake opening. Ram stream constrictions enhance the ram static pressure inside the low velocity air plenums which enhance the efficiency of ramjets on the ram-axialflow inducing nozzles 4 and 5 of turbo-induction jet air breathing engine.

Figure 20:
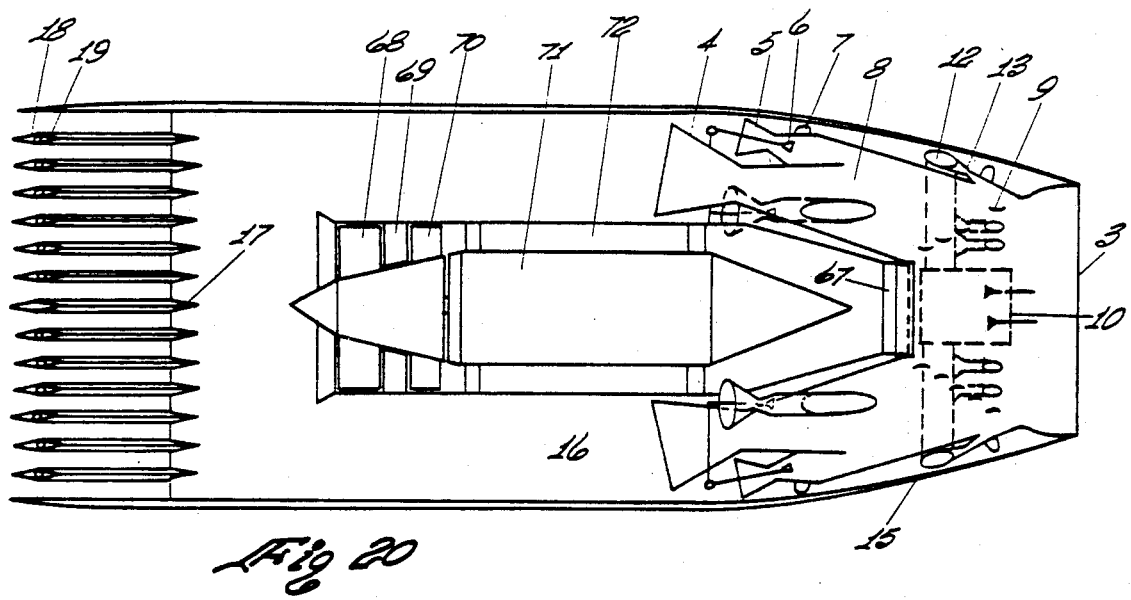
FIG. 20 is a plan view of the liquid fuel prevaporization and back burning induction jet oval thrust nozzle attached to the round exit pipe of an air breathing jet engine.
Figure 21:
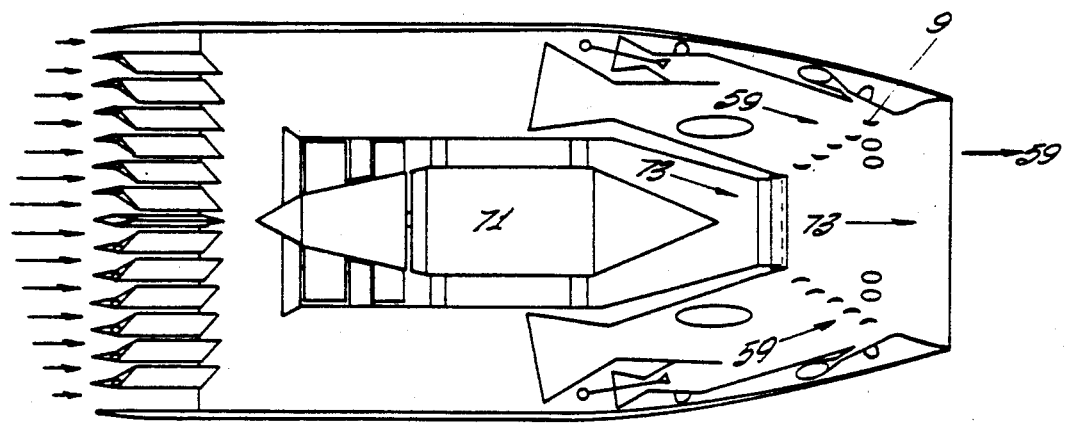
FIG. 21 is a schematic diagram showing the air distribution of the ramjet induction axialflow turbine when the aircraft is is supersonic flight.
Figure 22:
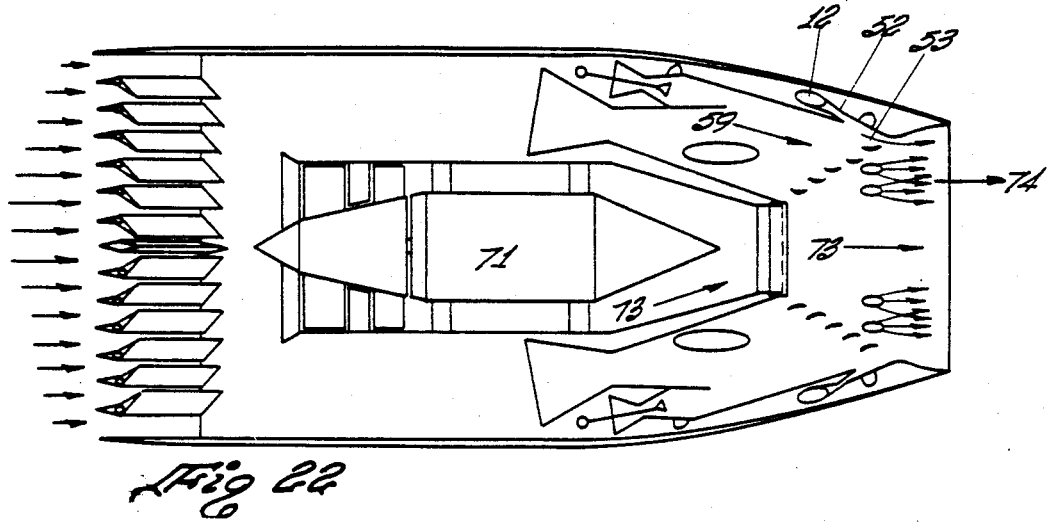
FIG. 22 is a schematic diagram showing the air breathing of the ramjet induction axialflow turbine ehaust stream which receives the prevaporized liquid fuel to produce the flame thrust stream during hypersonic flight.

The ram-stream constriction air intake system for ramjets induction axialflow is illustrated in FIGS. 20, 21 and 22. Rigidly fixed straignt vane 17 is positioned on the center-line of the axial flow turbine. Deflectable trailing section of vanes 18 and 19 are equally spaced and located on both sides of the rigidly fixed straight vans and deflect the trailing section of vanes 19 which are bent towards the rigidly fixed straignt vane 17. A stream shaping action occurs downstream of the vanes at the front of the axialflow turbine during supersonic flight. The streams are constrained and control the stream properties and the conversation of ram dynamic pressure to static pressure at the stream critical pressure on the front of the axialflow turbine to enhance the power of the axialflow turbine.

The power plant of an aircraft utilizing the liquid fuel prevaporization induction jet oval thrust nozzle is illustrated in FIGS. 1, 2, 3 and 4. The engine has a round engine exit nozzle 2 and the fuel prevaporization induction jet oval thrust nozzle has an oval thrust nozzle 3 and the interior of the thrust nozzle provides the transition from the round exit nozzle 2 to the oval thrust nozzle 3. The thrust nozzle is fabricated with main airflow inducing nozzles 4, fuel injecting airflow inducing nozzles 5 fitted with conventional fuel injectors 6 and ignitors 7, combustion chambers 8, inductors vanes 9, liquid fuel prevaporization chambers 10 fitted with fuel injecting sprays 11 and pressurized vapor gas distributing manifolds 12 having discharge nozzles 13 fitted with ignitors 14. Airflow inducing nozzles 4 and 5 having bellmouths, which enable the air to enter the nozzles, are installed inside of the ram-constriction air inlet plenums 16 which are empty spaces in the engine pod on both sides of the engine.

The downstream throat of the airflow inducing nozzle are diverging throats and direct the airflow into the combustion chamber 8. The combustion chamber 8 has major axes span which extend from the round exit nozzle to the oval transition tail pipe and encloses the parallel, verically, equally spaced curved inductor blades which curve in the direction of the downstream flow. The hollow spaces between the envelope of the plenum 15 and flat span of the major axes transition wall comprise the open pressure vessel for vaporization boiling chambers 10 fitted with liquid fuel injecting sparays 11.

The chambers are connected with prevaporization and pressurized gas distributing manifolds 12 with discharge nozzles 13. The discharge nozzles 13 are inclined in a downstream direction and are connected to the minor axes areas of the oval thrust nozzle. The discharge nozzles 13 are fitted with ignitors 14 which are located at the vaporized gas air mixing point. The openings of the discharge nozzles 13 are adequate for slip flows of thrust stream and are positioned slightly upstream from the throat of the oval thrust nozzle for accommodation of ignition time span and to process the temperature reactants of the after/back burning combustions at downstream throat of the oval thrust nozzles. The vaporization boiling chambers are installed in the center portion of the diverging major axes exhaust stream zones of the oval thrust nozzles. This results in the boiling chambers 10 inner walls increasing in temperature due to heat transmitted from the engine exhaust stream.

The pressure inside the vaporization boiling chambers fluctuates in response to the injecting rates of the liquid fuel sprays. When the fuel injection is turned off, the boiling chambers are maintained at a high temperature and a negative pressure. Cavitation is caused by the dynamic pressure of the oval thrust stream as it slip-flows over the downstreamwardly inclined openings and induces the negative pressure inside the hollow chamber through the throats of the inclined suck nozzles 13 and the distributing manifolds 12. When this occurs, the boiling chambers are maintained at a high temperature and negative pressure. The means that the air mass inside the boiling chambers is maintained at a minimum for preventing explosion when the fuel injection is started and continuous combustion cannot occur in inside the vaporization boiling chambers.

In order to turn-on the liquid fuel prevaporization and back burning, liquid fuel spray is injected into the high temperature-negative pressure of the boiling chambers. The liquid fuel is vaporized which expands its volume and builds up the local pressure inside the boiling chambers. The thermal energy of the engine exhaust is converted into dynamic pressure inside the boiling chambers. The temperature of the engine jet stream after the engine exit nozzle and before the throat of the oval thrust nozzle is reduced which increases the nozle efficiency and enhances the random velocity of the thrust stream downstream of the oval thrust nozzle. The vaporized and pressurized gases expand and are discharges through the convergent-divergent inclined nozzles 13.

The liquid fuel prevaporization and pressurization afterburners result prevaporization and pressurization of liquid fuel before mixing of the same in the airstream and to reduce the time required for vaporization and expansion of the gas in the airstream. The expansion/-combustion of in the short span of the airstream and the explosion in the downstream throat of the oval thrust nozzle increases the thermal head/dynamic pressure of the oval thrust rarifies stream. Any excess of the flamable vaporized gas flow resulting from the fuel injection flows into the throat of the oval thrust nozzle. As a result, continuous combustion will occur downstream of the nozzle exit and preceeding the back-fire on the surrounding airstream interaction which is an oblique shock stream induced from the forward speeding edge of the wing. The actuation of the oval thrust nozzle produces a real high temperature thrust stream from the rocket nozzle. As a result, a liquid fuel prevaporization and backburning induction jet oval thrust nozzle is achieved. This is power source operates on the induction principal and is the aerodynamic system of the aircraft.

The induction jet power plant os illustrated in FIGS. 5 and 6 is a prefabricated liquid fuel prevaporization and back burning induction jet oval thrust nozzle and slip fits on the round exit nozzle 2 of the conventional air breathing engine 1 which is enveloped with ram constriction air inlets plenums 15, 16 17, 18 and 19.

Installation of the power plant is illustrated in FIGS. 8, 9, 10 and 11 and the power plant is installed forward of the aerodynamic generating channel located forward of and above the vacuum cell induction lift wing 25 and below the recycling air inductor vanes 31. The transition tail pipe of the oval thrust nozzle is designed such that their major axes are horizontal and their minor axes are vertical. The engine jet stream passes through the engine exit nozzle 2, then through the transition tail pipe where the stream is constrained vertically. The converging jet stream is converted into an adverse pressure in the direction of flow and this adverse pressure reconverts into a velocity head in the direction of flowing in the diverging region of the oval thrust transition tail pipe.

The converging of the stream with the diverging transition tail pipe functions to shape the stream and to reduce turbulence in the round vorticity engine exhaust stream. The stream is constrained in the converging zones. The stream geometric contours are subject to stream separation at the horizontal divergent region. Thus, the stream underexpands in the direction of flow and the conversion into a velocity in the diverging zones is achieved through adverse pressure from the converging portion of the tail pipe. Conversion into a velocity is achieved by the thermal head effect occuring on the diverging contours of the transition tail pipe. The conversion velocity effect is proportional to the contours of nozzle and to the thermal head.

The stream shaping action inside the transition tail pipe develops the momentum equilibrium-freedom balancing of the stream dynamic pressure developed by the induction airflow inducing nozzles and inductor vanes.

The stream shaping action results in a vertically constrained, laminated stream which gains adverse pressure in the direction of flow in the converging zones and which underexpands in the direction of flow on the diverging zones. This action stimulates random velocity flow in the diverging zones of the oval thrust transition tail pipe.

The random velocity of underexpanding airstream contours will slipflow over the downstreamwardly curved inductor blades 9 and generate a cavitation at the intermediate area of the inductor vanes. This cumulative cavitation is equal to the pulling force which occurs beyond the thermal stream dynamic pressure in the diverging stream contours. The pulling force of the stream dynamics induces the induction airflow from the low velocity air plenums through the airflow inducing nozzles. This results in the induction airflow balancing the pulling pressure of the thermal stream dynamics. The balancing occurs because of the freedom balancing of stream shaping action with the momentum equilibrium of the stream dynamic pressure of the induction jet oval thrust transition tail pipe.

The inductor vanes 9 are so positioned near the boundary layers which surround the underexpanded region of the engine exhaust stream inside the diverging area of the oval transition tail pipe. FIGS. 12 and 16 show the boundary layers 40 and 40' which exists at the interface of the turbojet stream 38 and the induction airstream 39 or ram jets 59.

The position of boundary layers will shift in response to changes in the speed of flight. FIG. 12 shows the boundary layers 40, which are located near the inductor vanes 9, when the aircraft is stationary or during low speed flight of the aircraft. FIG. 16 shows the boundary layers 40', which shift toward the center-line of the engine jetstream 38, when the aircraft is in supersonic flight.

The processing of the thrust stream inside the induction jet oval thrust transition tail pipe's result in a cylindrical vortex engine jet stream passing first through the round section of the engine nozzle 2 and then through the transiton tail pipe. The strong random velocity of the engine exhaust stream will be constained by the adverse pressure gradient at the vertical convergence zone. The stream will be underexpanded in the direction of flow in the region of horizontal divergence. The diverging contours are subject to stream separation illustrated in FIG. 12. The underexpanding engine jet stream 38 slipflows over the inductor vanes 9 and generates the induction airstreams 39 through the airflow inducing nozzles 4 and 5. This results in an induction airflow having a reduction in separation of engine exhaust stream at the diverging contours of the tail pipe and an increase in the volume of the oval thrust stream. A drastic reduction of stream separation occurs at the horizontal divergent due to the vertical constriction of stream-strain action resulting in a vertical converging, airstream shaping action taking over which nearly diesout the stream rotation vorticity distribution and fully develops the atream flow into a nearly uniform profile, which means a laminated high volume thrust stream is achieved in the oval thrust nozzle. The above can be achieved by an induction jet oval thrust nozzle being fitted onto a conventional air breathing engine.

The prime force behind the induction air flowing is that a turbojet stream is achieved by means of the turbo-induction jet air breathing engine wherein the thrust stream is processed by the principle of induction which is freedom balancing beyond the dynamic pressure of thermal thrust stream on the diverging contours of transition tail pipe. A laminary high volume rarefied flow results which is used for the produciton of aerodynamic forces.

These streams shaping actions are processed by the local component of the induction jet oval thrust tail pipe before the stream passes through the exit nozzle of the oval thrust nozzle. This results in reduced vorticity turbulences of engine exhaust stream and the lamination of the stream by the transition tail pipe's convergance combining with the diverging shaping action of the induction airflow. The induction jet oval thrust transition tail pipe induces a high volume air breathing effect while reducing turbulance in the rarefied jet thrust which flows through the aerodynamic generating channel over the vacuum cell induction lift wing. The vacuum cell induction lift wing has an acoustically treated hollow interior and the airfoil has airtight partitions which contain downstream inclined slot openings and the jet thrust stream flows over the slots.

Figure 13:
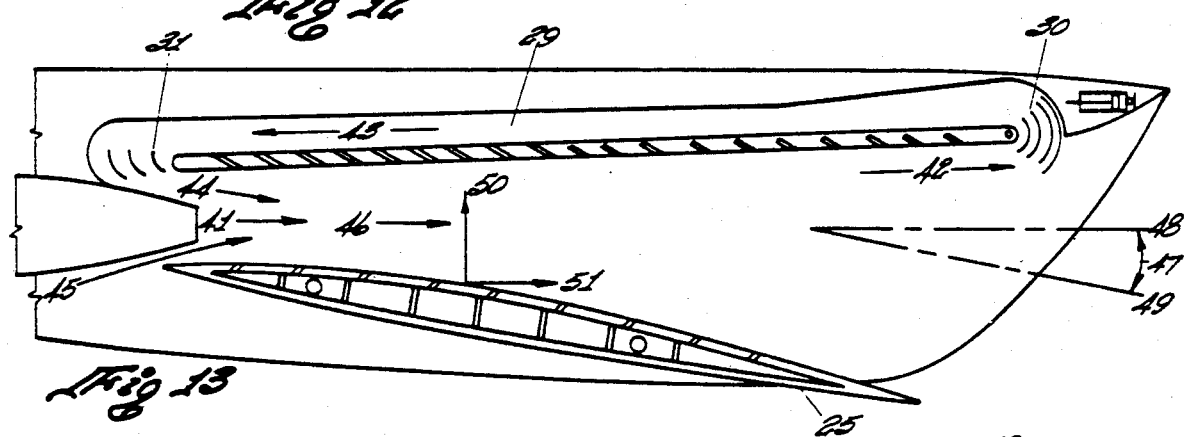
FIG. 13 is a schematic showing the air distribution of turbo-induction jet air breathing thrust stream in the aerodynamic generating channel when the aircraft is operated in a neutral position, low speed flight or deceleration of flight.

The turbo-induction jet air breathing oval thrust stream in the aerodynamic generating channel is illustrated in FIG. 13. The dynamic pressure of the oval thrust stream 41 is an induced airstream which recycles and surrounds the aerodynamic generating channel. The airstream 44 is recycled as the thrust peripheral flow diverts the stream flow into the forward upper portion of channel as a diverting flow 42 turning vanes 30 and as a reversed flow 43 through duct 29 and recycling air inductor vanes 31. The surrounding airstream 45 is induced at the forward portion of the channel through the slot gap between the flat span of the oval thrust nozzle and leading edge of wing. These airstreams increase in volume at the forward section of the aerodynamic generating channel and are merged with the induction jet thrust stream. This increases the airstream 46 flowing through the aerodynamic generating channel over the vacuum cell induction lift wing and generates the aerodynamic lift 50 and drag 52 forces. The drag force on the wing counter balances the forward thrust of engine idling operation when the aircraft is stationary.

The operation of a turbo-jet air breathing rocket oval thrust stream is illustrated in FIG. 14. During hovering operation or forward acceleration, which occurs with turned on fuel injecting sprays in the vaporization chambers, a prevaporized and pressurized gas stream 52 flows into the induction air stream zones 39 of the oval thrust nozzles 13. As a result, the turbo-jet air breathing oval thrust stream receives the prevaporized liquid fuel. Ignition of the combustible air mixture 53 produces a flame thrust stream 54 downstream of the oval thrust nozzle. This results in a high thermal rocket thrust stream which creats a turbo-induction jet air breathing rocket thrust engine. This is accomplished by the liquid fuel prevaporization and back burning induction jet oval thrust nozzle which fits onto the convention air breathing engine.

Figure 15:
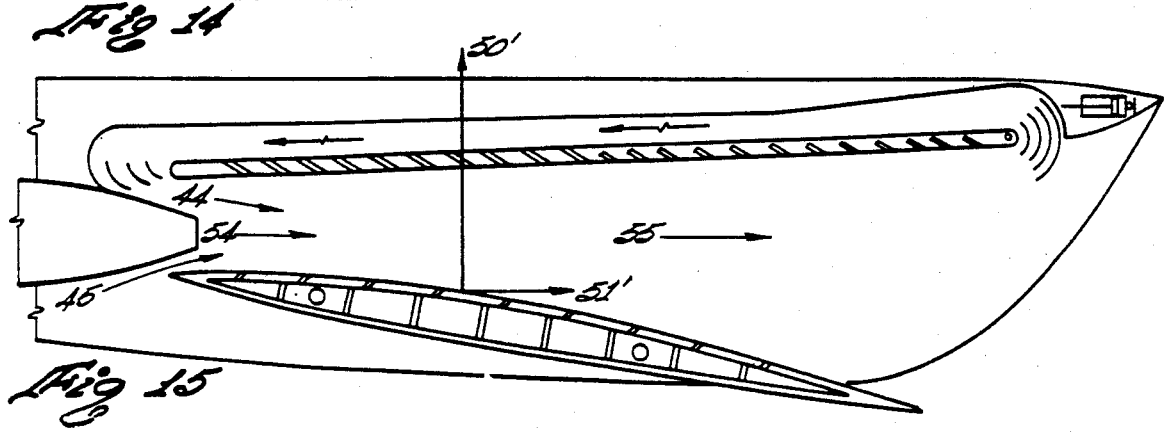
FIG. 15 is a schematic diagram showing the distribution of turbo-induction jet rocket air breathing thrust stream in the aerodynamic generating channel when the aircraft is operated in maximum hovering capacity with extreme incidence of angle of wing.

The hovering capacity is generated by the turbo-induction air breathing engine rocket oval thrust channel as illustrated in FIG. 15. In FIG. 15, the dynamic pressure of the oval thrust flame stream induces recycling and surrounding air streams. The recycling airstream 44 is the thrust peripheral flow which is diverted into the forward and upper portions of the channel through the turning vanes 30, through the reversed flow duct 29, the lower portion of the channel, through the turning vanes 30 and reversed flow duct 29 and through the recycling air inductor vanes 31. The surrounding airstream 45 is located at the forward and lower portion of channel, and passes through the slot gap between the flat span of the oval thrust nozzle and the leading edge of wing. These streams increase the volume of airstream in the channel and are merged with flame of the turbo-induction jet air breathing rocket thrust. The merging of these streams produces the expanding combustion thrust stream and flow through the diverging contours of the aerodynamic generating channel over the vacuum cell induction lift wing.

The dynamic pressure of the expanding combustion thrust stream 55 slipflows over the downstreamwardly inclined slot openings of vacuum cell wing. This stream action on the wing induces a vacuum in the internal cells of the wing which creates aerodynamic lift and drag forces on the wing. These forces correspond with the incidence angle 47 of the wing. The incidence angle 47 is the angle between the center-line of thrust stream and chord line wing. The forces generated on the wing result in the drag force counteracting the foreward thrust of engine and stabilizing the horizontal moment of the airframe. The lift force balances the weight of the aircraft. Hovering is produced by the turbo-induction jet air breathing rocket thrust aerodynamic generating channel. Aircraft VTOL hovering manoeuvers are achieved by the turbo-induction jet air breathing rocket thrust aerodynamic generating channel.

The operation of a turbo-ram induction jet air breathing oval thrust stream, during supersonic flight, is illustrated in FIG. 16. FIG. 16 shows that the ram constriction air inlet plenums 16 gain in ram-static pressure and that the ramstream flows through the airflow inducing nozzles 4 and 5 past turned on fuel injectors 56 located downstream of the fuel injection airflow inducing nozzles 5. The combustion mixture 57 is ignited and produces a flame stream 58 which flows into and combines, downstream of the main airflow inducing nozzle 4, with the airstream as the flame stream enters the combustion chamber. The expanding combustion streams produce ramjet streams through the diverging contours of the combustion chamber and the expansion of the ramjets streams 59 which combine with turbojet stream 38 at oval thrust nozzle. The oval thrust nozzle handles the turbojet air stream and the ramjets streams to create a turbo-ram induction jet air breathing engine. The air intake free stream is a tangentially flowing, oblique-stream which interacts with the throat constriction inside the low velocity air plenums to producing critical pressures in the ram-airstream resulting first in the constraining and then the expansion of the ram-airstream which controls the ram pressure on air intake bell-mouths of airflow inducing nozzles which function as the ramjet components of the induction jet oval thrust nozzle.

The turbo-ram induction jet air breathing rocket oval thrust stream, during hypersonic flight, is illustrated in FIG. 18. As illustrated in FIG. 18, the fuel injecting sprays are turned on in the vaporization chambers to produce the prevaporized and pressurized gas stream 52 which is discharged into the ramjet stream zones located at the oval thrust nozzle. The prevaporized and pressurized gas stream 52 passes through the distributing manifolds and inclined discharge nozzles into the ramjet stream. The turbo-ram induction jet air breathing stream receives the prevaporized liquid fuel and when the mixture is ignited, the combustible mixture 53 produces flame thrust stream 64 downstream of the oval thrust nozzle. The ignited mixture products a high thermal stream, such as a rocket thrust stream, creating the turbo-ram induction air breathing rocket thrust engine.

Figure 19:
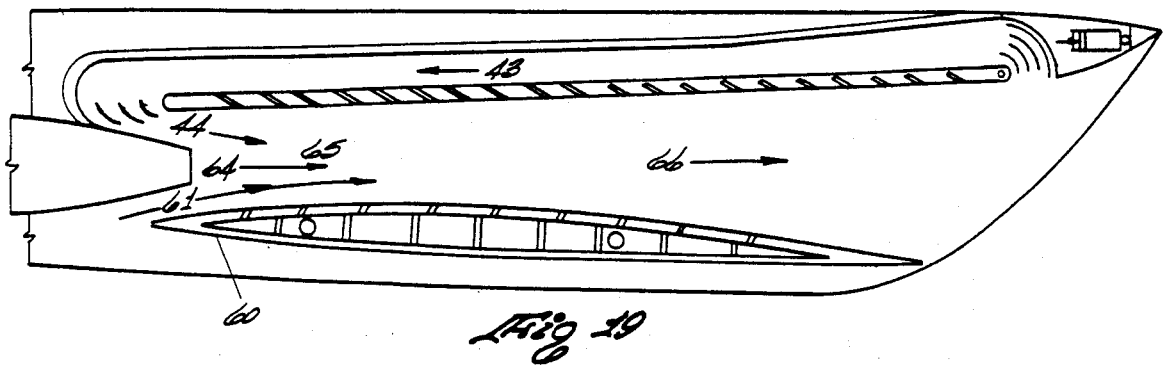
FIG. 19 is a schematic diagram showing the distribution of turbo-ram induction jet air breathing rocket thrust stream in the aerodynamic generating channel when the aircraft is operated in hypersonic flight.

As illustrated in FIG. 19, hypersonic flight is generated with the turbo-ram induction jet air breathing rocket oval thrust stream flow through the diverging contours of aerodynamic generating channel. The dynamic pressure of the back burning oval thrust stream induces the recycled airstream 44 which is the thrust peripheral flow diverted into the forward and upper portion of the channel and through the reverse flow duct 43 and the recycling air inductor vanes 31.

The forward leading edge 60 of wing at the airspeed of the aircraft induces the oblique shock airstream 61 to interact with the flame stream stream 64 of the turbo-ram induction jet air breathing rocket thrust. These streams are tangentially to develop the critical pressure and to form the high velocity free stream in throat 65 located in the forward section of the channel. These streams are merged which produces the expanding combustion downstream of the free stream throat and expanded to produce the hypersonic velocity of thrust stream 66 in the diverging contours of channel thus creating a turbo-ram induction jet air breathing rocket aerodynamic thrust channel.

The ramjet induction axialflow turbine is achieved by the liquid fuel prevaporization and back burning induction jet oval thrust nozzle, illustrated in FIGS. 20, 21 and 22, during high speed flight. The liquid fuel prevaporization and back burning induction jet oval thrust nozzle slip fits on the exit pipe 67 of a conventional axialflow turbine (rotators 68, 70 and stators 69). An electric generator is installed inside the exhaust pipe 72 of the axialflow turbine which has a ram constriction air inlet plenum.

Ram constriction assembly having multiple vanes 17, 18 and 19 is fitted on the inclined ram-air intake opening foreward of the plenum pod located on the front of the axial flow turbine inlet diffuser. The forward speed of aircraft generates a ramstream which passes through the deflectable multiple vanes 18 and 19 of the air intake and then flows into the plenum pod. The trailing sections of multiple vanes 19 are deflected towards the rigidly fixed straight vane 17 at the center-line of the axialflow turbine. The ram-stream passing through the multiple vanes is inflected in the flow direction and is tangentially constrained to produce a critical pressure on front of the axialflow turbine inlet diffuser. The critical ram pressure flow impinges on the axialflow turbine blades 68 and 70 rotating the turbine wheels.

The expanding ramjet thrust streams 59 flow through the inductor vanes 9 and induce a negative pressure differential on the turbine inlet and outlet. This enhances the power of the ram-axialflow turbine and operates the electric generator. The ramjet-induction axialflow turbine operation is obtained by the liquid fuel prevaporization and back burning induction jet oval thrust nozzle fitted onto the conventional axialflow turbine having a ram constriction air inlet plenum located in ram stream zone of airframe.

The liquid fuel prevaporization and backburning induction jet oval thrust nozzle of this invention is used for an induction lift aircraft.

I claim:

1. A vacuum cell induction lift wing adapted for use in an aerodynamic generating channel having an elongated main generating channel defined by an inlet adjacent a jet engine which communicates with the main generating channel, an upper portion defining a reverse flow channel and wherein the lower portion and outlet of the main generating channel is opened and is part of said main generating channel comprising an airfoil including a leading edge and a trailing edge and having a top panel and an acoustically treated hollow interior, said airfoil including airtight partitions forming individual cells within said hollow interior and having inclined slots which extend from the top panel of said airfoil into each of said individual cells, said inclined slots extending at an angle from each of said individual cells toward the trailing edge of said airfoil, said airfoil being adapted to be positioned within an aerodynamic generating channel in the lower portion thereof and spaced from the upper portion forming said elongated channel with the top panel of the airfoil being adapted to form a lower boundary of a said aerodynamic generating and forming an outlet for the main generating generating channel between the trailing edge of the airfoil and the rearward section of the upper portion forming the reverse flow channel and being adapted to define a slipflow thereacross from an airstream passing through a said aerodynamic generating channel;

support means operatively coupled to said airfoil adjacent the trailing edge for enabling said airfoil to be rotated therearound to change the angle of incidence of the top panel to a said airstream passing thereacross; and pivoting means actuators operatively coupled to said airfoil adjacent the leading edge for moving said airfoil leading edge relative to a said airstream by rotating said airfoil around said support means to change the angle of incidence of said top panel relative a said airstream enabling a said airflow to generate a vacuum within said individual cells having a pressure which is determined by the angle of incidence of the top panel of the airfoil to the said airstream and by the shearing stress of a said airstream passing over said inclined slots in the top panel of said airfoil.

2. A jet thrust peripheral flow recycling system adapted to be located rearward of and adjacent to the thrust nozzle of a jet engine producing a jet thrust stream comprising a housing defining an aerodynamic generating channel adapted to pass a jet thrust stream from a thrust nozzle of a jet engine therethrough, said housing including a main generating channel having an inlet and an outlet and a reverse flow channel located in the upper portion of the main generating channel channel and separated from the main generating channel by an acoustically treated panel having inclined orifices which are directed towards this outlet, said reverse flow channel having an inlet opening located at the outlet of the main generating channel and an outlet opening located adjacent the inlet of the main generating channel, said inclined orifices being operative to provide a slipflow for a said jet thrust stream passing through the main channel;

a vacuum induction lift wing comprising an airfoil including a leading edge and a trailing edge and having a top panel and an acoustically treated hollow interior, said airfoil including airtight partitions forming individual cells within said hollow interior and having inclined slots which extend from the top panel of said airfoil into each of said individual cells, said inclined slots extending at an angle from each of said individual cells toward the trailing edge of said airfoil, said airfoil being positioned within an aerodynamic generating channel with the top panel of the airfoil being adapted to form a lower boundary of a said aerodynamic generating channel and being adapted to define a slipflow thereacross from an airstream passing through a said aerodynamic generating channel;

support means operatively coupled to said airfoil adjacent the trailing edge for enabling said airfoil to be rotated therearound to change the angle of incidence of the top panel to a said airstream passing thereacross; and pivoting means actuators operatively coupled to said airfoil adjacent the leading edge for moving said airfoil leading edge relative to a said airstream by rotating said airfoil around said support means to change the angle of incidence of said top panel relative a said airstream enabling a said airflow to generate a vacuum within said individual cells having a pressure which is determined by the angle of incidence of the top panel of the airfoil to the said airstream and by the shearing stress of a said airstream passing over said inclined slots in the top panel of said airfoil;

reverse flow turning vanes located in the inlet of the reverse flow channel and being adapted to divert a portion of a said jet thrust stream passing through said reverse flow channel back into the main generating channel; and actuators operatively coupled to said reverse flow vanes for controlling the position of the reverse flow turning vanes relative to a said jet thrust stream passing through the main generating channel to regulate the volume of a said jet thrust stream being diverted into and pasing through said reverse flow channel.

3. An induction aerodynamic lift generating apparatus adapted to be located rearward of and adjacent to the thrust nozzle of a jet engine producing a jet thrust stream comprising a housing defining an aerodynamic generating channel having an elongated main generating channel defined by an inlet adjacent a jet engine which communicates with the main generating channel, an upper portion defining a reverse flow channel and wherein the lower portion and outlet of the main generating channel is opened and is part of said main generating channel adapted to pass a jet thrust stream through including said main generating channel having said inlet and an outlet and said reverse flow channel located in the upper portion of the main generating channel channel and separated from the main generating channel by a panel, said reverse flow channel having an inlet opening located at the outlet of the main generating channel and an outlet opening located adjacent the inlet of the main generating channel;

an airfoil including a leading edge and a trailing edge and having a top panel and an acoustically treated hollow interior, said airfoil including airtight partitions forming individual cells within said hollow interior and having inclined slots which extend from the top panel of said airfoil into each of said individual cells, said inclined slots extending at an angle from each of said individual cells toward the trailing edge of said airfoil, said air foil being adapted to be positioned within said aerodynamic generating channel in the lower portion thereof and spaced from the upper portion forming said elongated channel with the top panel of the airfoil being adapted to form a lower boundary of a said aerodynamic generating and forming an outlet for the main generating generating channel between the trailing edge of the airfoil and the rearward section of the upper portion forming the reverse flow channel and being adapted to define a slipflow thereacross from a jet thrust stream passing through a said aerodynamic generating channel;

support means operatively coupled to said airfoil adjacent the trailing edge for enabling said airfoil to be rotated therearound to change the angle of incidence of the top panel to a said jet thrust stream passing thereacross; and pivoting means actuators operatively coupled to said airfoil adjacent the leading edge for moving said airfoil leading edge relative to a said jet thrust stream by rotating said airfoil around said support means to change the angle of incidence of said top panel relative a said jet thrust stream causing a said airflow to generate a vacuum within said individual cells having a pressure which is determined by the angle of incidence of the top panel of the airfoil to the said jet thrust stream and by the shearing stress of a said jet thrust stream passing over said inclined slots in the top panel of said airfoil, said jet thrust stream being adapted to pass through the aerodynamic generating channel and over the top surface of the vacuum cell induction lift wing for producing thermal aerodynamic lift and drag forces which are determined by the angle of incidence of said vacuum cell induction lift wing and that portion of said jet thrust stream being diverted into and passing through said jet thrust stream being diverted into and passing through the reverse flow channel and back into the main generating channel.

* * * * *